April 19, 1966   L. M. BALLAMY   3,246,781
MOTOR VEHICLES
Filed Nov. 3, 1964   3 Sheets-Sheet 1
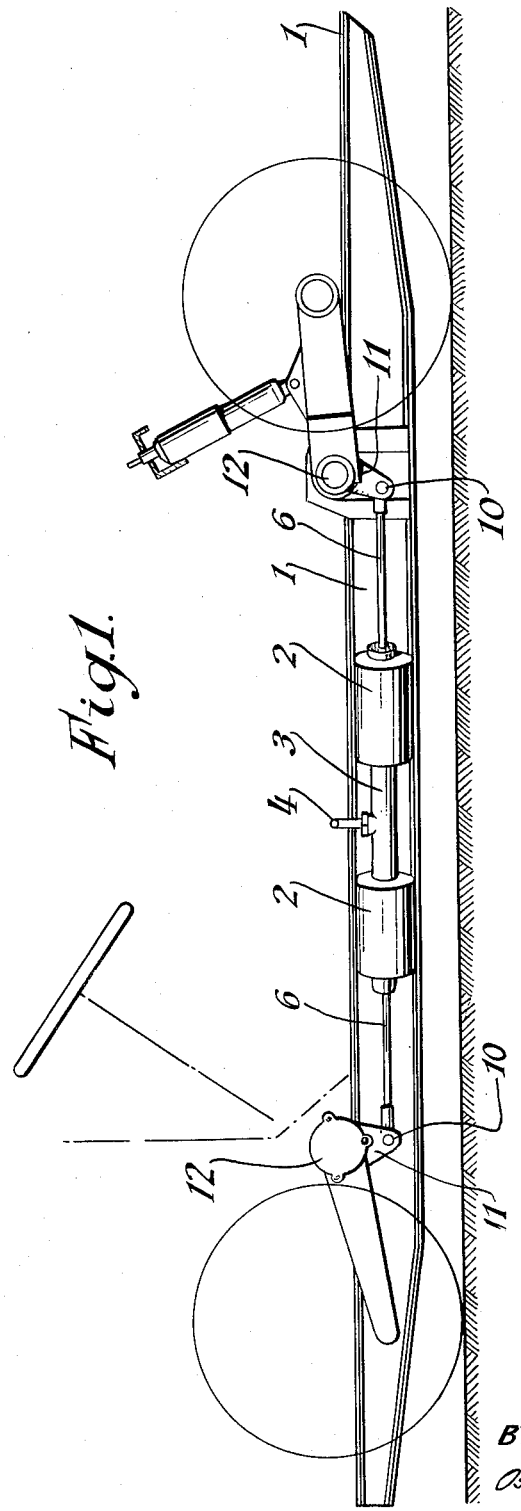
INVENTOR
LESLIE MARK BALLAMY
BY
OSTROLENK, FABER, GERB & SOFFEN
ATTORNEYS

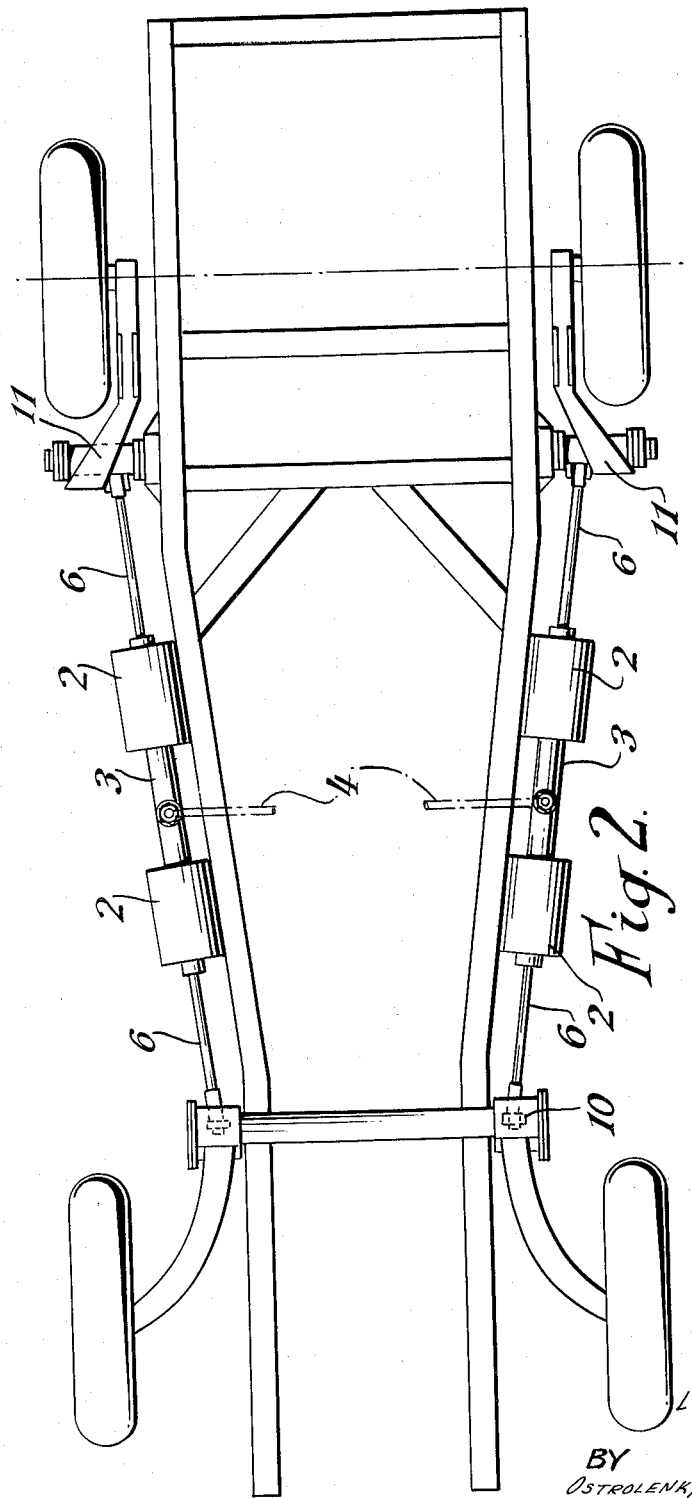

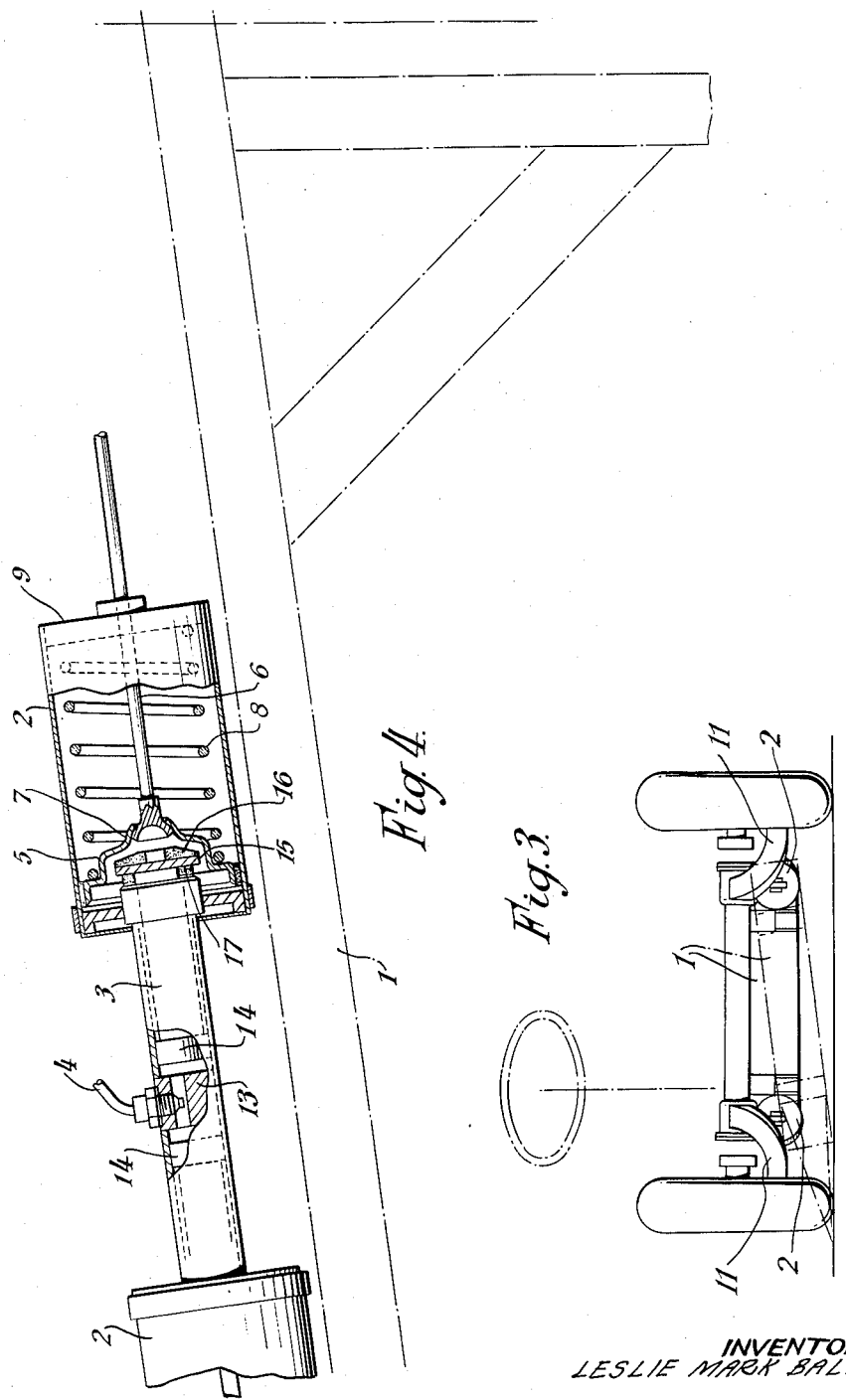

United States Patent Office 3,246,781
Patented Apr. 19, 1966

3,246,781
MOTOR VEHICLES
Leslie Mark Ballamy, Guildford, England, assignor to National Fund For Research Into Poliomyelitis and Other Crippling Diseases, London, England, a company of limited liability
Filed Nov. 3, 1964, Ser. No. 408,479
7 Claims. (Cl. 214—506)

This invention relates to motor road vehicles the phrase "motor road vehicles" being intended to cover road vehicles which are propelled by internal combustion engines or road vehicles of the kind propelled by electric motors.

The chief object of this invention is to evolve a construction of motor road vehicle which will be suitable for driving by persons who have lost one or both legs or have lost the use or partial use of their legs and consequently are unable unassisted to reach the driving seat.

The invention is, however, applicable for use generally to assist in the easy loading of a motor vehicle.

The present invention is virtually an improvement in or modification of that forming the subject of our prior British Patent application No. 10,205/63, wherein the road vehicle was enterable from the rear and included means whereby the floor of the vehicle could be inclined when required into a position in which the floor at the rear is in contact with or in close vicinity to the ground to enable a person in a wheeled chair to enter the vehicle from the rear and if desired reach a position in which the person still in the wheel chair can manipulate the steering wheel and suitable hand operable driving controls, means being provided for locking the wheel chair in such a position and means for returning the vehicle to its normal driving position in which the floor is horizontal or substantially horizontal.

Although access to such a vehicle could normally be obtained there is always the possibility of another vehicle parking immediately behind the invalid's vehicle and preventing his re-entry and it is an object of the present invention to avoid such a possibility.

A motor road vehicle in accordance with the present invention includes a floor which is capable of lateral tilting movement into a position in which one longitudinal edge of the floor is in contact with or in close vicinity of the ground to facilitate ingress and egress to and from the vehicle on one side.

It will be appreciated that the usual driver's seat will not be provided, the wheel chair occupying the position taken by the driver's seat. It is preferred to employ a wheel chair of special construction wherein the effective height of the chair can be reduced by suitable means under the control of the user, so that the user can, either before entry into the vehicle or subsequently, adjust the height of the chair to suit his own requirements and enable him to operate the various driving controls easily.

It is proposed in carrying out the invention to drive the front wheels of the vehicle, thereby enabling a vehicle to be produced having a flat floor free from protuberances, and due to the absence of a back axle and differential enabling the rear of the vehicle to be lowered to, or almost to ground level.

Although any suitable form of suspension may be employed it is preferred to employ a system of suspension wherein the springs or other resilient components for the front and rear wheels are situated centrally or substantially centrally of the length of the vehicle and take the form of self contained spring boxes or suspension units connected with the front and rear axles by a system of levers and rods.

Referring to the accompanying drawings:
FIGURES 1 and 2 are respectively a side elevation and plan view of a motor road vehicle chassis incorporating the invention;
FIGURE 3 is a front elevation of the chassis; and
FIGURE 4 is a fragmentary section drawn on an enlarged scale.

The vehicle chassis 1 illustrated is designed for lateral tilting movement in either direction, the chain dotted lines in FIGURE 3 indicating the position of the chassis when tilted to the right to enable the driver to enter or leave the vehicle on the right hand side with a minimum of inconvenience.

The chassis carries on each side a pair of fixed spring boxes or suspension units 2 arranged in spaced relationship but rigidly connected by tubular connecting members 3, each carrying a tubular connector 4 for a purpose hereinafter referred to.

Each box as shown clearly in FIGURE 4 contains a piston 5 coupled to a piston rod 6 by means of a universal ball type joint 7, a coil spring 8 being interposed between the piston and an end cover plate 9 of the box, the piston rod 6 projecting through the cover plate and being pivotally connected at 10 to a bell-crank lever 11 pivotally associated with the chassis at 12, the four bell cranks carrying the front and rear wheel axles.

The tubular connecting members 3, one of which is clearly shown in FIGURE 4, are divided longitudinally by a transverse partition 13 and form a pair of cylinders each containing an axially slidable ram or piston 14 which projects into its associated spring box and carries a head 15 fitted with a rubber or similar snubber 16 adapted to engage the adjacent piston 5. A second rubber or similar snubber 17 is interposed between the head of the ram and the end of the cylinder, the two snubbers preventing chatter when the vehicle is in motion.

The two cylinders and their associated rams or pistons therefore constitute a double jack, the rams being moved in opposite directions to engage the pistons and compress the springs 8 under pressure from a pump or other source of hydraulic fluid supply, the fluid enetring the cylinders by way of the connectors 4.

It will be appreciated that compression of the springs as a result of the rams acting on the pistons will produce a follow-up action of the piston rods 6 to tilt the vehicle laterally, assuming, of course, that the double jack is operated on one side only of the vehicle for example on the right or off side as in FIGURE 3. It is preferred to provide a manually operable change over valve in the hydraulic circuit so that the vehicle can be tilted as required to the left or to the right.

The supply of pressure fluid may be obtained from an engine driven pump or a self-powered pump unit and although the chassis illustrated is shown fitted with double jacks on both sides, a double jack may be fitted on one side only for example on the right or off side.

In addition the spring boxes may be supported for axial displacement in the manner described and shown by the specification and drawings of the co-pending patent application above referred to, whereby the driver of the vehicle has the option to tilt the vehicle rearwardly or laterally.

In the case of a vehicle in which the chassis is suspended by a hydraulic suspension system, tilting can be effected by exhausting the hydraulic fluid on one side of the vehicle and subsequently returning the vehicle to an even keel by returning the hydraulic fluid under pressure by means of the pump.

Access to the vehicle is obtained by a sliding door, the steering column preferably including a hinged or universal joint whereby the steering wheel may be moved into a position in which it will not impede entry to the vehicle. It will be appreciated that although normally it will only be necessary to fit the double jack into one spring box, both spring boxes may if desired be so fitted, thus enabling the body to be tilted laterally to the left or to the right, operation of the jacks being under the control of a suitable selector valve.

To enable the wheel chair to be propelled up the sloping floor and then manoeuvred into its correct position, the floor may be fitted with a suitable turntable onto which the chair is propelled, the turntable being then rotated to move the wheel chair and occupant into a position in which he faces forwardly.

Preferably the pump is brought into or out of operation by means of a control switch or switches normally provided on the outside of the vehicle which could be easily reached by the patient in his chair. The switch or switches may also actuate the door, the door being preferably of the sliding type. A duplicate switch or switches would be provided inside the vehicle to enable the driver to operate the mechanism when seated in the vehicle.

I claim:

1. In combination:
   a motor vehicle chassis;
   first and second suspension units mounted on said chassis on a first side thereof, said first and second suspension units each including piston means linked to a front and rear wheel, respectively, for providing suspension thereof with respect to said chassis; and
   means connected to said first and second suspension units for urging their respective piston means in opposite directions to allow said one side of said chassis to tilt into substantial contact with the ground.

2. The combination of claim 1, wherein said last named means includes a pair of rams movable in opposite directions into engagement with the piston means of each suspension unit, movement of said rams in opposite directions causing them to urge said respective piston means in opposite directions.

3. In combination:
   a motor vehicle chassis having first and second bell-crank levers pivotally secured to one side thereof at opposite ends thereof;
   a front and rear wheel rotatably mounted on one end of said first and second bell-crank levers, respectively;
   first and second suspension units for suspending said front and rear wheels, respectively, with respect to said chassis, said suspension units each including piston means connected to a second end of one of said bell-crank levers; and
   means connected to said first and second suspension units for urging their respective piston means in opposite directions to allow said one side of said chassis to tilt into substantial contact with the ground.

4. In combination:
   a motor vehicle chassis;
   first and second suspension units mounted on said chassis on a first side thereof, said first and second suspension units each including piston means linked to a front and rear wheel, respectively, for providing suspension thereof with respect to said chassis; and
   a double-acting jack connecting said first and second suspension units, said double-acting jack including a pair of rams movable in opposite directions into engagement with the piston means of each suspension unit, movement of said rams in opposite directions causing them to urge their respective piston means in opposite directions to allow said one side of said chassis to tilt into substantial contact with the ground.

5. The combination of claim 4, wherein said double-acting jack further includes a cylindrical member rigidly secured between said first and second suspension units, said pair of rams being guidingly maintained with said cylindrical member for movement in response to pressure introduced into the interior thereof.

6. The combination of claim 5, wherein each of said suspension units includes a chamber housing one end of its respective piston means, said cylindrical member being secured at opposite ends thereof to the chamber of each of said suspension units, one end of each of said rams extending into the chamber of its associated suspension unit.

7. In combination:
   a motor vehicle chassis;
   first and second pairs of suspension units mounted on said chassis on a first and second side thereof, respectively, first ones of said first and second pairs of suspension units including piston means linked to an associated one of a pair of front wheels for providing suspension thereof with respect to said chassis, second ones of said first and second pairs of suspension units including piston means linked to an associated one of a pair of rear wheels for providing suspension thereof with respect to said chassis; and
   means connected to said first and second pairs of suspension units for selectively urging the piston means of the suspension units of one of said pairs in opposite directions to allow the side on which said one of said pairs is mounted to tilt into substantial contact with the ground.

References Cited by the Examiner

FOREIGN PATENTS 821,175    11/1951    Germany.

GERALD M. FORLENZA, Primary Examiner.

HUGO O. SCHULZ, Examiner.

A. J. MAKAY, Assistant Examiner.